United States Patent [19]
Cone

[11] 3,849,828
[45] Nov. 26, 1974

[54] RETAINER CLIP FOR WINDSHIELD WIPER BLADES

[75] Inventor: Irwin C. Cone, Littleton, Colo.

[73] Assignee: The Gates Rubber Company, Denver, Colo.

[22] Filed: Apr. 2, 1973

[21] Appl. No.: 347,582

[52] U.S. Cl. ............................................. 15/250.42
[51] Int. Cl. ............................................... B60s 1/04
[58] Field of Search............ 15/250, 250.36, 250.37, 15/250.38, 250.34, 250.40, 250.41, 250.42

[56] References Cited
UNITED STATES PATENTS

| | | | |
|---|---|---|---|
| 3,099,031 | 7/1963 | Ludwig | 15/250.42 |
| 3,121,903 | 2/1964 | Ludwig | 15/250.42 |
| 3,427,637 | 2/1969 | Quinlan et al. | 15/250.42 |
| 3,667,083 | 6/1972 | Linker | 15/250.42 |
| 3,823,437 | 7/1974 | Hauke | 15/250.42 |

*Primary Examiner*—Peter Feldman
*Attorney, Agent, or Firm*—Curtis H. Castleman, Jr.; Raymond Fink; H. W. Oberg, Jr.

[57] ABSTRACT

A wiper blade having an improved retention clip including a lower portion engaged within a channeled backing strip for limiting lengthwise movement of a squeegee within the channeled backing strip, and an upper deformable abutment portion which extends above the backing strip serving the purpose of limiting movement of a pressure-distributing superstructure with respect to the backing strip to which it is slidably attached. Deformation of the abutment portion of the clip permits detachment of the backing strip and squeegee from the superstructure.

12 Claims, 13 Drawing Figures

PATENTED NOV 26 1974

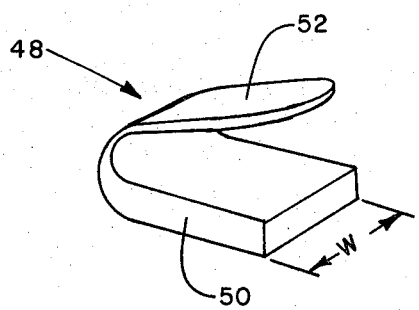
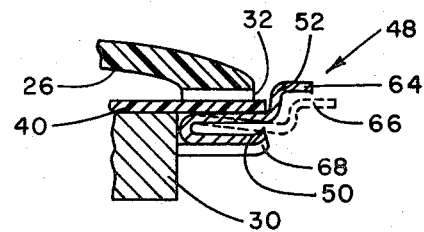
FIG. 8  FIG. 9
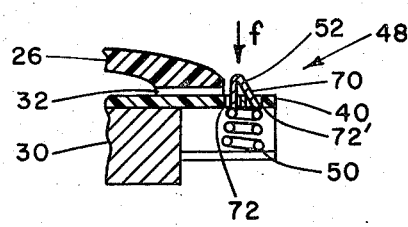
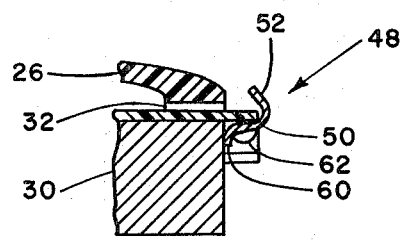
FIG. 10  FIG. 11
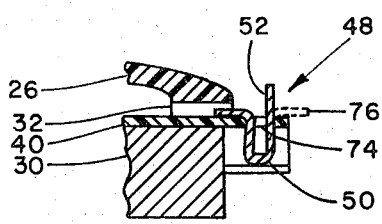
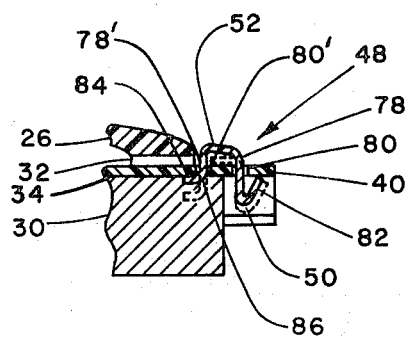
FIG. 12  FIG. 13

RETAINER CLIP FOR WINDSHIELD WIPER BLADES

BACKGROUND OF THE INVENTION

This invention relates to windshield wiper blades and particularly to means for limiting the lengthwise movement of the squeegee and superstructure, respectively, with respect to a channeled backing strip squeegee holder and also for permitting detachment of the various parts.

Channeled backing members such as shown in Oishei, U.S. Pat. No. 2,706,305 and Heller, U.S. Pat. No. 3,408,680 customarily include a substantially flat or arched bridge member connecting and from which is projected juxtaposed side rails which engage the reduced neck portion of an elastomeric squeegee wiping member. Such a channeled construction lends itself to molding or extrusion forming of a plastic material with minimal costs of raw material, fabrication and assembly. The channel stock may also be made from metal stampings exemplified by the well known channel configuration composed of side rails joined at a plurality of points by overhead spines or ribs.

The present invention has for its primary object the provision of a retaining clip of desired configuration which when engaged in the end of the channel of the backing strip will be capable of performing at least three functions: first, retention of the squeegee lengthwise within the channel; second, forming an abutment means to limit longitudinal movement of the superstructure beyond the ends of the blade; and third the ability to permit ready detachment of each of the squeegee, channeled backing strip, and superstructure from one another. The prior art has generally required a number of attachments to the blade, notches or certain fabrication methods such as heat forming to accomplish these functions. It is also an object to provide such a retaining clip which simultaneously provides the desired functions without itself having to be physically separated from the wiper assembly.

SUMMARY OF THE INVENTION

In one aspect, the invention is directed to a wiper assembly comprised of a blade subassembly or refill which is slidably connected to a pressure-distributing superstructure. The blade subassembly includes the usual squeegee member whose retention portion is held within the channel of a channeled backing strip, the backing strip extending marginally beyond the respective ends of the squeegee to define end receiving portions. A deformable clip has a squeegee stop portion engaged within the end receiving portion of the channeled backing strip, and has an abutment portion, connected to the squeegee stop portion, which extends upwardly from the channel and above the connecting bridge of the backing strip. This abutment portion is deflectable away from a normal abutment position so that the blade subassembly may be readily detached from the superstructure. The invention also relates to the blade subassembly.

BRIEF DESCRIPTION OF THE DRAWINGS

Certain preferred embodiments of the invention will be described in reference to the accompanying drawings, in which:

FIGS. 5–8 show in perspective alternative retention clips according to the invention; and FIGS. 9–13 illustrate views similar to FIG. 4 with various alternative retention clips.

PREFERRED EMBODIMENTS OF THE INVENTION

Figure 1:
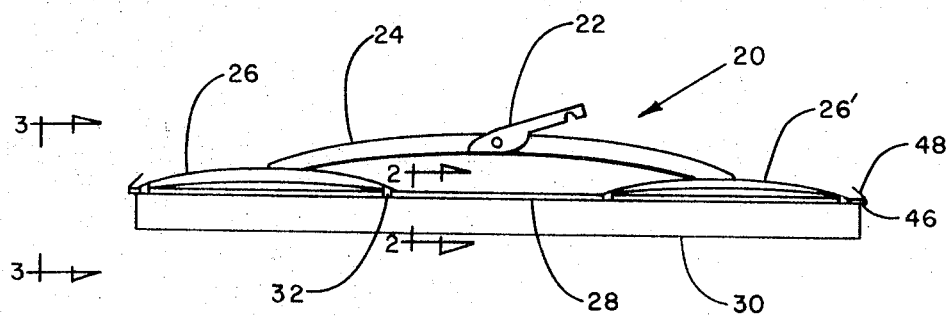
FIG. 1 is a side elevational view of the improved wiper blade assembly.

Referring to the drawings, a wiper assembly which may be used in conjunction with the windshield of an automobile, for instance, is generally designated at 20. An actuator arm (not shown) has its free end engagable with arm attaching clip 22 which is pivotally mounted in known manner to the wiper assembly. In general, the wiper consists of a superstructure which may be of various known configurations, exemplified by a pair of secondary yokes 26, 26' connected intermediate their respective ends to a primary yoke lever 24 which carries the pivotal arm attaching clip 22 intermediate the ends of the primary yoke. The wiper assembly is completed by a blade subassembly also known as a refill comprised of a squeegee support backing strip 28 and a conventional elastomeric wiping element or squeegee 30 held by the backing strip.

Each secondary yoke 26, 26' contains a pair of transversely aligned or staggered claws 32 which slidably connect the superstructure to the blade subassembly maintaining it in operative association.

Figure 2:
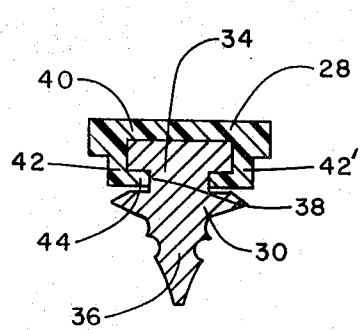
FIG. 2 is a sectional view of the blade subassembly viewed along section 2—2.

Referring to FIG. 2, the refill is shown to include a squeegee member 30 which is divided into a retention portion 34 joined to a wiping lip or portion 36 through a reduced neck 38. The squeegee retaining backing strip 28 is comprised of a base or connecting bridge portion 40 which may be generally flat, as shown, or of a hooded or domed shape, for instance, from which extends juxtaposed projections 42, 42' which carry opposed side rails 44 which may be planar, downwardly converging, etc., and which engage the reduced neck portion 38 of the squeegee. The connecting bridge 40, and projections 42 having inturned side rails 44 collectively define a longitudinal channel containing the retention portion 34 of the squeegee. Conveniently, the squeegee may be of a molded or extruded rubber-like material exemplified by natural and synthetic rubbers.

The channeled backing strip 28 may be made of a metallic material, in which case the connecting bridge member may be composed of a number of discrete spinal members well known in the art, although advantageously the channel member is made of a plastic material formed by a molding or most preferably an extrusion process. Examples of suitable plastics include polycarbonate and nylon. The channel member will have considerable flexibility in a plane normal to the windshield or other surface to be wiped, and in the case of a metal backing strip has substantial inflexibility in a plane parallel to the surface to be wiped. In the case where the channel member is made of a suitable plastic material, the squeegee assembly will be permitted to have substantial flexibility in a plane parallel to the wiping surface promoting more uniform wiping, as taught in the aforementioned Heller patent.

According to the invention, the channeled backing strip 28 longitudinally extends beyond the marginal extremities of the squeegee element defining end receiving portions 46, within the ends of the channel. A deformable retaining clip generally designated 48 is comprised of a squeegee stop portion 50 engaged within the channel, this stop portion connected to an abutment portion of the clip 52 which extends upwardly from the channel and above the connecting bridge 40 of the backing strip. This abutment portion in general is made of a spring-like material such as spring-steel or various plastic or suitable elastomeric materials so as to be deflectable either by hand or with a suitable tool to permit detachment of the blade subassembly from the superstructure.

Figure 3:
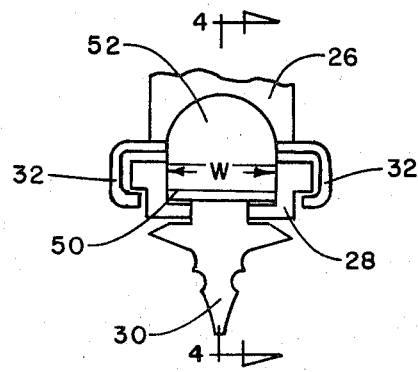
FIG. 3 is an end view showing the retention member in operative association as observed from vantage position 3—3.
Figure 4:
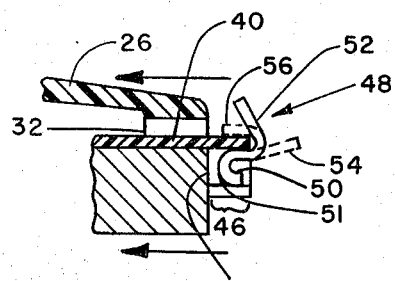
FIG. 4 is a partial longitudinal sectional view along section 4—4 of FIG. 3.
Figure 5:
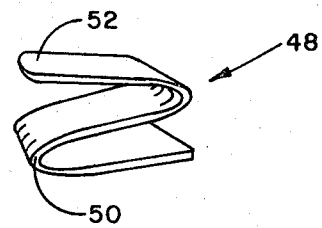

The specific embodiments shown in FIGS. 3–5 illustrate the use of a generally S-shaped clip, which may preferably be made of spring stainless steel. As best shown in FIG. 3, the width w of the clip at its squeegee stop portion may be substantially the same width as the channel member along the end receiving portion within which it is engaged, forming a friction fit. The width w may be slightly greater than the width of the channel so as to form a slight force fit. In any event, the clip should be firmly engaged within the channel to preclude its expulsion during operation. Normally the channel member is sufficiently resilient to accept forceful insertion of the clip. Enough of the squeegee stop portion 50 of the clip should be contained vertically within the end receiving portion of the channel to limit the lengthwise movement of the squeegee.

It is often desirable to leave a space between the ends of the squeegee 47 and the innermost penetration 51 of the clip to permit sufficient lengthwise movement of the squeegee within the channel as required by the wiper assembly as it is bent about curved portions of a wiping surface.

In detaching the blade from the superstructure, reference is made to FIG. 4 in which the abutment portion 52 which is normally in a position to limit lengthwise movement of the superstructure relative to the blade is made to deform or deflect in one of two ways. Deflection away from the wiper assembly exemplified by position 54, permits the blade subassembly to be slidably moved in the direction of the arrow with respect to the superstructure with the end of the blade consecutively passing under each claw 32 until they are fully detached. Sufficient clearance exists between the top of the claw and backing member 28 to permit the abutment portion 54 of the clip to slide under each claw and thereby be removed. Alternatively, the abutment portion 52 of the clip may be pressed downwardly toward the middle of the blade and against the top of the bridge 40 taking on position 56. Maintaining the abutment portion of the clip in position 56, the blade subassembly may be detached by sliding it in the direction of the arrow in which the abutment portion in position 56 slides beneath the undersurface of the claws 32 in consecutive manner until the entire blade is detached from the wiper superstructure.

Figure 7:
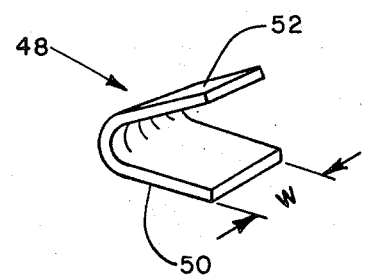

The embodiments shown in FIGS. 7 and 8 each have a squeegee stop portion 50 whose width w is sufficient to form a friction or force fit with the width of the channel in the backing strip to prevent displacement during operation. The embodiment in FIG. 8 is preferably formed of a plastic material having an enlarged squeegee stop or dam 50 and whereby the abutment portion 52 would be depressed downwardly to position 56 for detachment of the blade subassembly.

Figure 6:
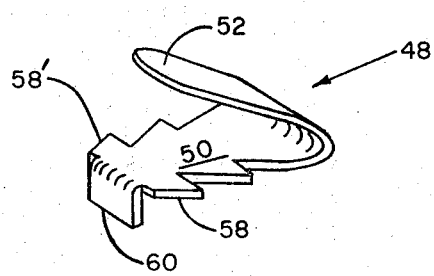

In the embodiment of FIG. 6, the under portion of the clip carries one or more sets of opposed barbs 58, 58'. The transverse distance between barbed edges is preferably slightly greater than the width of the channel so that upon forcing the clip within the channel the action of the barbs embedding in the sides of the channel will preclude removal of the clip. In this case the channel will be constructed of a material such as plastic of sufficient softness to engage the barbs. Downturned ear 60 provides a stop for the squeegee. As an alternative to the embodiment of FIG. 6, once the barbed clip has been inserted within the end receiving portion of the backing member, the plastic in intimate surrounding contact with the barbs is made to flow or melt about the barbs so as to embed at least a portion of the barbs and/or squeegee stop portion within plastic. This feature is shown in cross-section in FIG. 11 in which the end receiving portion of the channel has been subjected to a heating, ultrasonic welding or soldering treatment whereby plastic has been made to flow about the barbs and beneath the undersurface of the clip as shown at 62.

The embodiment of FIG. 9 employs a clip whose abutment portion has an outwardly generally horizontally extending flange or tab 64 which normally prevents lengthwise movement of the secondary yoke 26 and claws 32 yet when depressed to position 66 permits detachment of the blade from the superstructure. Additionally, the base 68 of the channel at its outer margin has been crimped or depressed upwardly to insure retention of the squeegee stop portion 50 of the clip. In general as applied to any of the embodiments, the base of the channel may be deformed to preclude removal of the clip during operation, although not necessary. If the channel is deformed it is preferred that the deformation would not prevent lengthwise removal of the squeegee, in the absence of the retaining clip.

The embodiment of FIG. 10 employs a triangular-shaped abutment member 52 having downwardly extending legs 70 which slidably pass through a pair of apertures 72, 72'. Within the end receiving portion a resilient member such as coil spring 50 is attached to the legs 70, the spring normally biasing the abutment member upwardly in a position to prevent lengthwise movement of the superstructure. Upon application of downward force f upon the abutment portion, the coil spring will be compressed to the point where the superstructure will have sufficient clearance at each claw to pass over the end of the backing strip and permit detachment. The embodiment of FIG. 12 also employs an aperture 74 in which is forced a generally U-shaped clip, which by its natural resilience is maintained securely within the aperture. The downwardly extending portion 50 acts as the squeegee stop portion, while the upwardly extending stem 52 normally limits movement of the superstructure yet may be deformed to position 76 to permit detachment.

In the embodiment of FIG. 13, the clip consists of a continuous thin member having an upright abutment portion terminating in two legs 78, 78' which descend through apertures 80, 80' and are each turned to bear against the undersurface of the channel at 82 and 84, respectively. The innermost leg 86 is held normally in an upper position by the resilience of the squeegee retention member 34, and may be plunged into the squeegee by depressing the abutment portion downwardly thereby permitting detachment.

It is preferred that there be significant longitudinal clearance, e.g., up to a total of about ⅜ inch, between the extremities of the superstructure and the respective abutment means 52. This clearance permits the blade to undergo bending about curved windshields for conformance therewith without binding or stressing which would otherwise occur if there was no clearance between the superstructure and clips. Furthermore, by utilizing a clip of the type which will permit a wide latitude of angular orientation with respect to the vertical, such as the embodiment shown in FIG. 4, the abutment portion may be bent in any desired orientation to provide a variance in horizontal clearance between the superstructure and clip. This ability to selectively vary the clearance makes a single standard size of the refill compatible with a variety of different superstructures of slightly different dimensions (such as provided by different manufacturers).

It will be understood that the invention is capable of a number of modifications and variations which will become apparent to those skilled in the art upon a reading of the present application, and which are meant to be included within the scope of the appended claims. For instance, the clip could be held within the end of the channel by means other than those described in the foregoing description, such as by cementing the clip within the channel, heat treatment or integrally molding the clip with the channeled member. Furthermore, while deformation of the abutment portion of the clip has been described principally as a deflection operation, other means such as bending the abutment portion to the point of breaking it off would be suitable such as where a new refill having its own individual end retaining clips would replace the old blade subassembly.

What is claimed is:

1. In a wiper assembly having a blade subassembly slidably connected to a pressure-distributing superstructure, said blade subassembly including a squeegee member having a wiping portion joined to a retention portion through a reduced neck and a backing strip having juxtaposed projections upstanding from a connecting bridge defining a longitudinal channel for receiving the retention portion of the squeegee lengthwise therein, and wherein said channel extends marginally beyond the respective ends of the squeegee to define end receiving portions, the improvement comprising:
   a deformable clip having a squeegee stop portion securely engaged within at least one of the end receiving portions of the channeled backing strip, and an abutment portion, connected to the squeegee stop portion, which extends upwardly from the channel and above the connecting bridge of the backing strip, said abutment portion being deflectable whereby the blade subassembly may be detached from the superstructure without separating the clip from the blade subassembly.

2. The wiper assembly of claim 1 wherein the backing strip is made of extruded plastic.

3. The wiper assembly of claim 1 wherein the deformable clip is made of a generally S-shaped metal clip in which the squeegee stop portion, which is contained within the lower half of the "S," and abutment portion, which is contained within the upper half of the "S," are integrally formed.

4. The wiper assembly of claim 1 wherein the deformable clip is generally U-shaped, the width of the squeegee stop portion being substantially the same as the width of the channel whereby a friction fit is formed.

5. The wiper assembly of claim 1 wherein the clip has a generally flat portion which fits within the channel and has at least one set of barbs along the outer surface thereof for engagement with the juxtaposed projections of the backing strip along the sides of the channel.

6. The wiper assembly of claim 1 wherein means are provided for securely engaging the squeegee stop portion within the end receiving portion of the channeled backing strip.

7. The wiper assembly of claim 6 wherein said means is provided by barbs protruding from the squeegee stop portion of the clip, and wherein the channeled member is made of a plastic material, and wherein at least a portion of the deformable clip contained within the end receiving portion of the channel is embedded within the plastic channel member by virtue of a heating or welding treatment which flows the plastic about the barbs of the deformable clip.

8. The wiper assembly of claim 1 wherein the abutment portion of the deformable clip is movable toward the superstructure and along the top portion of the connecting bridge of the backing strip, whereby said backing strip and squeegee may be detached from the superstructure.

9. The wiper assembly of claim 1 wherein the abutment portion of the deformable clip is movable away from the backing strip to permit detachment.

10. The wiper assembly of claim 1 wherein the abutment portion of the clip is made of a spring-like material which protrudes angularly in orientation with respect to the backing strip, which angular orientation is selectively variable.

11. In a blade refill the combination comprising:
    a backing strip having a connecting bridge and juxtaposed projections upstanding from the bridge and defining a longitudinal channel;
    a squeegee member having a wiping portion joined to a retention portion through a reduced neck, said retention portion being engaged within the longitudinal channel of the backing strip;
    said channel extending marginally beyond the respective ends of the squeegee to define end receiving portions;
    a deformable clip having a squeegee stop portion securely engaged within at least one of the end receiving portions of the channeled backing strip, and an abutment portion, connected to the squeegee stop portion, which extends upwardly from the channel and above the connecting bridge of the backing strip, said abutment portion being deflectable whereby the blade subassembly may be detached from the superstructure without separating the clip from the blade refill.

12. The blade refill of claim 11 wherein the abutment portion of the clip is made of a spring-like material which protrudes angularly in orientation with respect to the backing strip, which angular orientation is selectively variable.

* * * * *